United States Patent [19]

Tingey

[11] Patent Number: 5,392,555
[45] Date of Patent: Feb. 28, 1995

[54] ILLUMINATED FISHING LURE APPARATUS

[76] Inventor: Sheldon N. Tingey, 839 Highland Blvd., Brigham, Utah 84302

[21] Appl. No.: 185,255
[22] Filed: Jan. 24, 1994
[51] Int. Cl.$^6$ ............................................. A01K 75/02
[52] U.S. Cl. ...................................................... 43/17.6
[58] Field of Search ........................................ 43/17.6

[56] References Cited

U.S. PATENT DOCUMENTS

| | | | |
|---|---|---|---|
| 3,656,253 | 4/1972 | Gaunt . | |
| 3,721,033 | 3/1973 | Haynes . | |
| 4,227,331 | 10/1980 | Ursrey | 43/17.6 |
| 4,672,765 | 6/1987 | Lutz | 43/17.5 |
| 4,757,632 | 7/1988 | Grobl . | |
| 4,760,664 | 8/1988 | Amendola | 43/17.5 |
| 4,959,919 | 10/1990 | Rao et al. . | |
| 5,010,678 | 4/1991 | Peck | 43/17 |
| 5,175,951 | 1/1993 | Fruchey . | |

FOREIGN PATENT DOCUMENTS 1441640  5/1966  France ................... 43/17.6

*Primary Examiner*—Kurt Rowan
*Assistant Examiner*—James Miner

[57] ABSTRACT

A new and improved illuminated fishing lure apparatus includes a housing assembly which simulates a body of an organism. The housing assembly also includes two transparent portions that simulate two eyes of the organism. Two hook assemblies are attached to the housing assembly. One hook assembly is attached to the rear most portio of the housing assembly. The other hook assembly is attached to the bottom of the housing assembly. Contained within the housing assembly, a pair of illuminators is positioned adjacent to the transparent eye-simulating portions of the housing assembly. The illuminators serve as sources of illumination for the transparent eye-simulating portions of the housing assembly. An electronic flashing circuitry is also contained within the housing assembly and is connected to the simulated-eye illuminators. The electronic flashing circuitry drives the illuminators at a predetermined flashing rate. Preferably, the illuminators are LEDs. The electronic flashing circuitry includes a battery supply, an electronic flasher module connected to the battery supply, and a flash-rate-change assembly connected to the electronic flasher module, for changing the predetermined flash rate at which the illuminators flash. Preferably, the electronic flasher module is an LM3909 flasher module. More specifically, the flash-rate-change assembly is a variable capacitor.

5 Claims, 2 Drawing Sheets

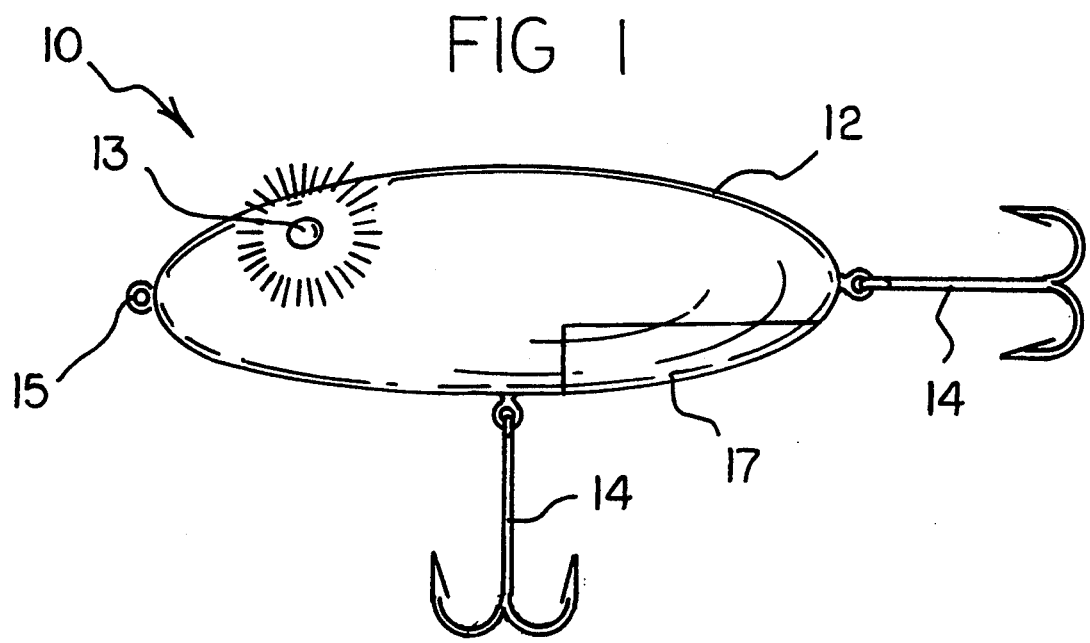
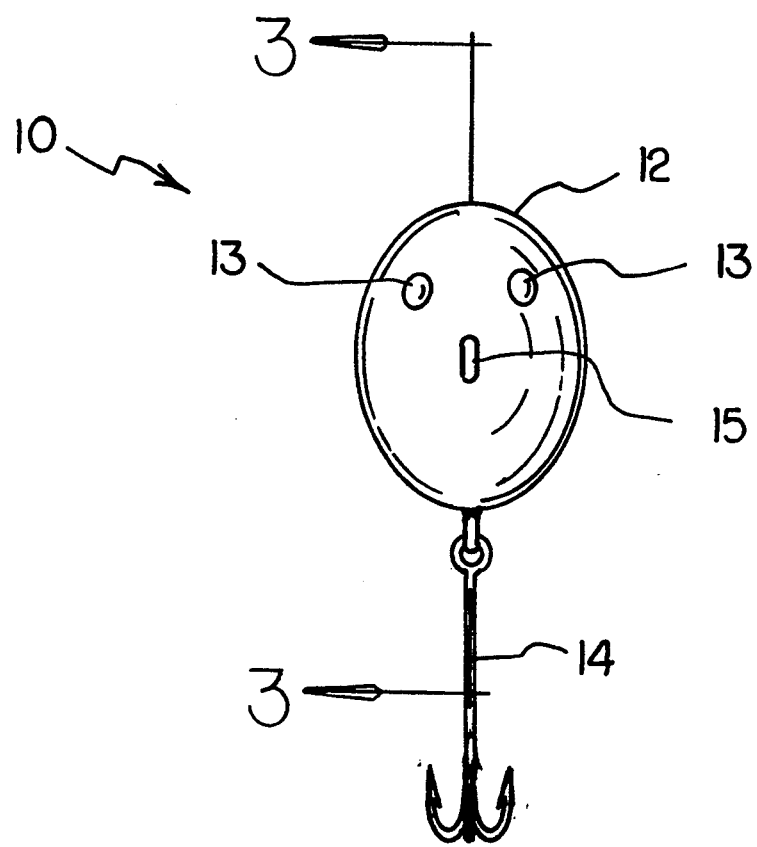

ILLUMINATED FISHING LURE APPARATUS

BACKGROUND OF THE INVENTION

1. Field of the Invention

The present invention relates generally to fishing lures and, more particularly, to fishing lures that include a self-contained source of illumination.

2. Description of the Prior Art

In the sport of fishing, artificial lures are often used instead of live bait. To be most effective, the artificial lure should have some qualities that appeal to one or more of a fish's senses. One of the fish's senses that are appealed to by many artificial lures is the sense of sight. It has been learned that an artificial lure that is internally illuminated may be especially effective in luring a fish. In this respect, throughout the years, a number of innovations have been developed relating to internally illuminated artificial lures, and the following patents are representative of some of those innovations: U.S. Pat. Nos. 3,656,253; 3,721,033; 4,757,632; 4,959,919; and 5,175,951.

When an illuminated fishing lure moves under water, the visual effects given off by the lure are variable and random depending upon a number of factors which include the color of the illumination, the movement path of the lure, water currents, the composition of the water, and the other objects that are under water. It has been learned, however, that some fish arc not readily attracted by such random visual effects. In this respect, of the patents cited above, U.S. Pat. Nos. 3,656,253, 3,721,033, and 5,175,951 disclose illuminated fishing lures that include a flashing source of illumination. The flashing source of illumination can provide a regular visual effect that may be more attractive to some fish than random visual effects.

Sources of illumination may vary with respect to their size and shape. For example, U.S. Pat. Nos. 4,757,632 and 5,175,951 disclose the use of light emitting diodes (LEDs) as the sources of illumination. U.S. Pat. No. 4,757,632 discloses LEDs in the form of eye of an artificial lure; and U.S. Pat. No. 5,175,951 provides a flashing LED.

In spite of the extensive disclosures in the patents cited above, there are still a number of deficiencies that the above-cited patents do not overcome. For example, certain predatory fish may be attracted by a specific flashing illumination pattern that emanates from eyes of an artificial lure. In addition, certain fish can perceive both the eyes and the associated body of their prey. For an artificial lure to be most effective in luring such fish, both the flashing eyes and the associated body should be perceived by the fish as a unified combination. Such a combination of flashing eyes and an associated body are not disclosed in the patents cited above.

Fish are cold-blooded creatures. As a result, in cold waters, some aspects of fish physiology may be slower than in warm waters. As a result, the response of some fish to flashing lights may be variable, depending upon their body temperature. Moreover, the sensory response of different fish may vary from species to species. In this respect, an artificial lure that includes a flashing light that has a constant rate of flash may not be effective in luring different species of fish or may not be effective in luring a single species of fish in different temperature waters. To overcome this problem, it would be desirable if an illuminated, flashing artificial lure were provided that included a device for selecting different flashing rates, Just a certain species of fish may respond to different flashing rates in an artificial lure, there is variation among fish as to the color of flashing light that would provided an optimum response. None of the patents cited above appear to perceive this problem, and none of the patents cited above provide a solution. In this respect, it would be desirable if an illuminated fishing lure device were provided which included variations in the color of the source of illumination.

Among the patents cited above, there are two ways of activating the artificial lure so that illumination begins. In one way, the user throws a switch before placed the artificial lure in the water. In the other way, a gap is provided between two electrical contacts, and, when the artificial lure is placed in the water, the water fills the gap. The conductive properties of the water complete the circuit between the gapped contacts, and the source of illumination is activated. A potential problem associated with the latter method of activation of illumination arises from the fact that the conductive properties of water are variable for a number of reasons which include water temperature and degree of salinity. As a result, the random variation is the conductivity of water that completes the electrical circuit can result in random variation in the performance of the circuit. If the circuit drives an source of illumination, the source of illumination may vary in a random manner. In this respect, to avoid problems of random variation in illumination, it would be desirable if an illuminated fishing lure device were provided which does not include an activation switch which depends on the conductivity of water.

As discussed above, U.S. Pat. Nos. 3,656,253, 3,721,033, and 5,175,951 disclose illuminated fishing lures that include a flashing source of illumination. More specifically, U.S. Pat. No. 3,721,033 discloses a transistorized flashing fishing lure that includes a plurality of transistors, resistors, and capacitors. In addition, U.S. Pat. No. 5,175,951 discloses a complex array of circuit elements and circuit boards to drive the flashing LED. The respective circuitry in U.S. Pat. Nos. 3,721,033 and 5,175,951 are both circuitry specifically designed for the application at hand. None of the patents disclose the use of an off-the-shelf electronic module that can readily be used instead of the specifically designed circuitry. For purposes of simplicity of construction and for purposes of reduced expense, it would be desirable if the electronic circuitry used to control flashing illuminators in an artificial fishing lure be based on an off-the-shelf module.

A number of off-the-shelf electronic modules have been available for in the market place for a number of years, and a wide variety of specific electronic circuits have been published based on such off-the-shelf modules. Off-the-shelf flasher modules for driving LEDs are well known, and it would be desirable if an illuminated fishing lure were provided with an off-the-shelf flasher module for driving LEDs. More specifically, the Siliconix Incorporated flasher module known as LM3909 is such an off-the-shelf module that can be used for driving LEDs, and a number of LED-based flasher circuits based on the LM3909 have been published. In this respect, it would be desirable if an illuminated fishing lure device were provided which included an LM3909 flasher module.

The flashing rate of an electronic flasher is often dependent upon the time constant of an RC circuit. By changing either the resistance (R) or the capacitance (C) in the RC circuit, the time constant can be changed and, consequently, the flash rate can be changed. In this respect, it would be desirable if an illuminated fishing lure device were provided with either a variable resistance or a variable capacitor in an RC circuit so that the flash rate of the flasher can be changed as desired.

Thus, while the foregoing body of prior art indicates it to be well known to use flashing artificial fishing lures, the prior art described above does not teach or suggest an illuminated fishing lure apparatus which has the following combination of desirable features: (1) provides an illuminated artificial fishing lure that includes flashing LEDs in the form of flashing eyes associated with a simulated body; (2) includes a device for selecting different flashing rates; (3) includes variations in the color of the source of illumination; (4) does not include an activation switch which depends on the conductivity of water; (5) employs an off-the-shelf electronic module for controlling the flash rates of the lure illuminators; (6) is provided with an off-the-shelf flasher module for driving LEDs; (7) includes an LM3909 flasher module for driving LEDs; and (8) is provided with either a variable resistance or a variable capacitor in an RC circuit so that the flash rate of the flasher can be changed as desired. The foregoing desired characteristics are provided by the unique illuminated fishing lure apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved illuminated fishing lure apparatus which includes a housing assembly which simulates a body of an organism. The housing assembly also includes two transparent portions that simulate two eyes of the organism. Two hook assemblies are attached to the housing assembly. One hook assembly is attached to the rear most portio of the housing assembly. The other hook assembly is attached to the bottom of the housing assembly. Contained within the housing assembly, a pair of illuminators is positioned adjacent to the transparent eye-simulating portions of the housing assembly. The illuminators serve as sources of illumination for the transparent eye-simulating portions of the housing assembly. An electronic flashing circuitry is also contained within the housing assembly and is connected to the simulated-eye illuminators. The electronic flashing circuitry drives the illuminators at a predetermined flashing rate. Preferably, the illuminators are LEDs.

The electronic flashing circuitry includes a battery supply, an electronic flasher module connected to the battery supply, and a flash-rate-change assembly connected to the electronic flasher module, for changing the predetermined flash rate at which the illuminators flash. Preferably, the electronic flasher module is an LM3909 flasher module. More specifically, the flash-rate-change assembly is a variable capacitor.

The above brief description sets forth rather broadly the more important features of the present invention in order that the detailed description thereof that follows may be better understood, and in order that the present contributions to the art may be better appreciated.

There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved illuminated fishing lure apparatus which has all of the advantages of the prior art and none of the disadvantages.

It is another object of the present invention to provide a new and improved illuminated fishing lure apparatus which may be easily and efficiently manufactured and marketed.

It is a further object of the present invention to provide a new and improved illuminated fishing lure apparatus which is of durable and reliable construction.

An even further object of the present invention is to provide a new and improved illuminated fishing lure apparatus which is susceptible of a low cost of manufacture with regard to both materials and labor, and which accordingly is then susceptible of low prices of sale to the consuming public, thereby making such illuminated fishing lure apparatus available to the buying public.

Still yet a further object of the present invention is to provide a new and improved illuminated fishing lure apparatus which provides an illuminated artificial fishing lure that includes flashing LEDs in the form of flashing eyes associated with a simulated body.

Still another object of the present invention is to provide a new and improved illuminated fishing lure apparatus that includes a device for selecting different flashing rates.

Yet another object of the present invention is to provide a new and improved illuminated fishing lure apparatus which includes variations in the color of the source of illumination.

Even another object of the present invention is to provide a new and improved illuminated fishing lure apparatus that does not include an activation switch which depends on the conductivity of water.

Still a further object of the present invention is to provide a new and improved illuminated fishing lure apparatus which employs an off-the-shelf electronic module for controlling the flash rates of the lure illuminators.

Yet another object of the present invention is to provide a new and improved illuminated fishing lure apparatus that is provided with an off-the-shelf flasher module for driving LEDs.

Still yet another object of the present invention is to provide a new and improved illuminated fishing lure apparatus which includes an LM3909 flasher module for driving LEDs.

An even further object of the present invention is to provide a new and improved illuminated fishing lure apparatus that is provided with either a variable resistance or a variable capacitor in an RC circuit so that the flash rate of the flasher can be changed as desired.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is an exterior side view showing a preferred embodiment of the illuminated fishing lure apparatus of the invention.

FIG. 2 is a front exterior view of the embodiment of the illuminated fishing lure apparatus shown in FIG. 1.

DESCRIPTION OF THE PREFERRED EMBODIMENT

Figure 3:
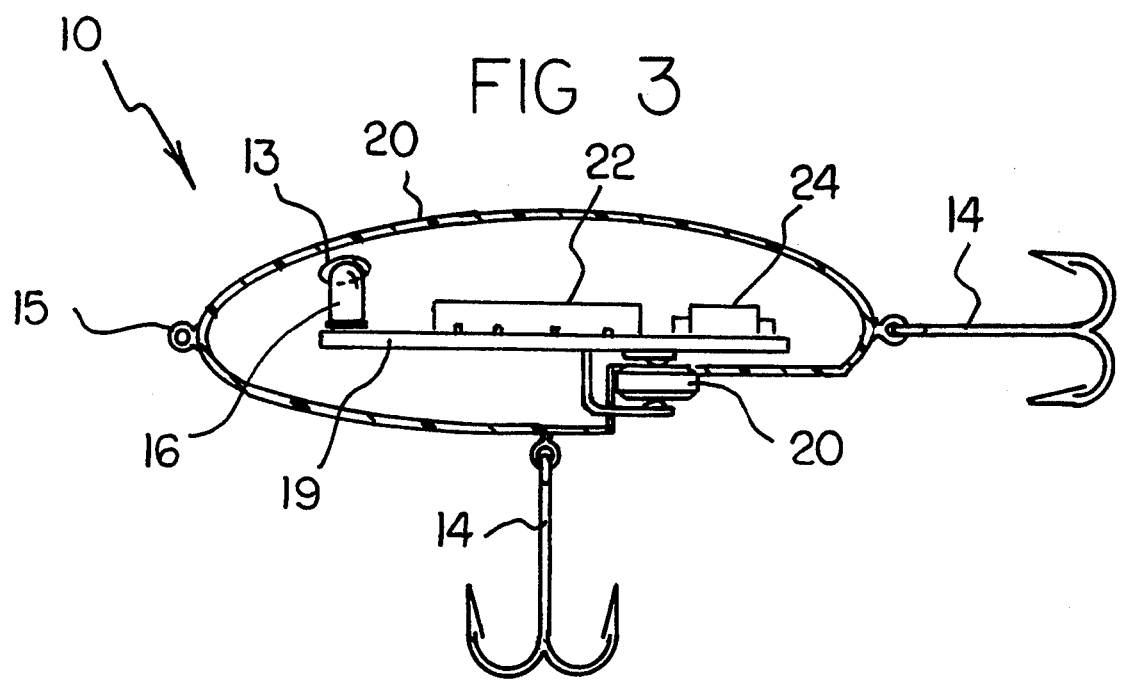
FIG. 3 is a cross-sectional view of the embodiment of the illuminated fishing lure apparatus of FIG. 2 taken along line 3—3 thereof.

With reference to the drawings, a new and improved illuminated fishing lure apparatus embodying the principles and concepts of the present invention will be described.

Turning initially to FIGS. 1-4, there is shown an exemplary embodiment of the illuminated fishing lure apparatus of the invention generally designated by reference numeral 10. In its preferred form, illuminated fishing lure apparatus 10 includes a housing assembly 12 which simulates a body of an organism. The housing assembly 12 also includes two transparent portions 13 that simulate two eyes of the organism. Two hook assemblies 14 are attached to the housing assembly 12. One hook assembly 14 is attached to the rear most portio of the housing assembly 12. The other hook assembly 14 is attached to the bottom of the housing assembly 12. Contained within the housing assembly 12, a pair of illuminators 16 is positioned adjacent to the transparent eye-simulating portions 13 of the housing assembly 12.

The illuminators 16 serve as sources of illumination for the transparent eye-simulating portions 13 of the housing assembly 12. An electronic flashing circuitry 18 is also contained within the housing assembly 12 and is connected to the simulated-eye illuminators 16. The electronic flashing circuitry 18 drives the illuminators 16 at a predetermined flashing rate.

The housing assembly 12 also includes an eyelet 15 for attaching to a fishing line (not shown). In addition, an access door 17 is provided for the housing assembly 12 for gaining access to the electronic flashing circuitry 18 and the illuminators 16 housed within the housing assembly 12. Access is needed to change the battery supply 20 when it needs replacing, to change the illuminators 16 (e.g. LEDs) when they need replacing, and to change the flashing rate of the electronic flashing circuitry 18 by adjusting the flash-rate-change assembly 24 (e.g. the variable capacitor). A water-tight seal is provided between the access door 17 and the remainder of the housing assembly 12.

Preferably, the illuminators 16 are LEDs. For ease in changing the LEDs from one color to another, preferably the LEDs can be plugged into and unplugged from a circuit board 19. It is known that LEDs come in a variety of colors including red, green, and yellow.

The electronic flashing circuitry 18 includes a battery supply 20, an electronic flasher module 22 connected to the battery supply 20, and a flash-rate-change assembly 24 connected to the electronic flasher module 22, for changing the predetermined flash rate at which the illuminators 16 flash. The electronic flasher module 22 is an LM3909 flasher module. More specifically, the flash-rate-change assembly 24 is a variable capacitor. Preferably, the variable capacitor includes 220 microfarads within its range of variation.

Figure 4:
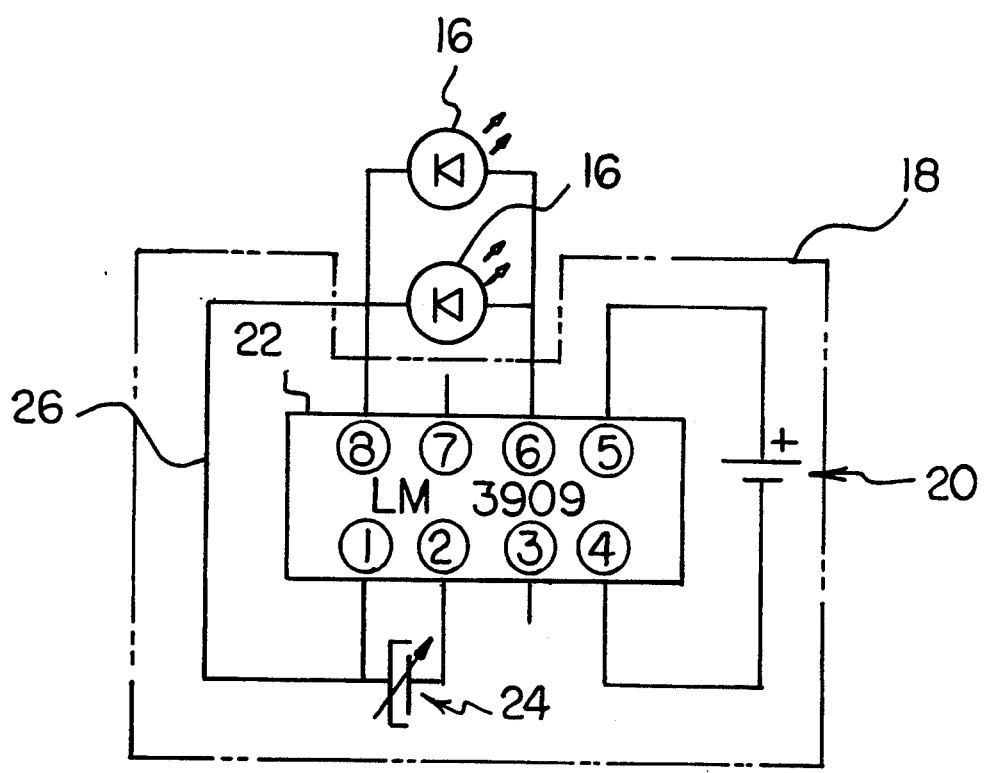
FIG. 4 is an electrical circuit diagram of the circuitry used in the embodiment of the invention shown in FIG. 3.

More specifically with reference to FIG. 4, a 1.5 volt battery 20, such as commonly used as a watch battery, is connected to the electronic flasher module 22, which is the LM3909 flasher module, by connection to pins 5 and 6 of the LM3909 flasher module. The positive terminal of the battery supply 20 is connected to pin 5, and the negative terminal of the battery 20 is connected to pin 4. A pair of LEDs 16 are connected to pins 6 and 8 of the LM3909 flasher module 22. A variable capacitor 24 is connected to pins 1 and 2 of the LM3909 flasher module 22. With the variable capacitor 24 being connected to pins 1 and 2 of the LM3909 flasher module 22, the variable capacitor 24 is implicitly connected in an RC circuit in the LM3909 flasher module 22. A conductor 26 also connects pin 1 to pin 8. In the embodiment of the electronic flashing circuitry 18 shown in FIG. 4, no connections are made to pins 3 and 7 of the LM3909 flasher module 22.

Alternatively, the flash-rate-change assembly 24 can be a variable resistor in an RC circuit which controls the rate of flash of the LEDs 16.

The components of the illuminated fishing lure apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved illuminated fishing lure apparatus that is low in cost, relatively simple in design and operation, and which may advantageously be used to include flashing LEDs in the form of flashing eyes associated with a simulated body. With the invention, an illuminated fishing lure apparatus is provided which includes a device for selecting different flashing rates. With the invention, an illuminated fishing lure apparatus is provided which includes variations in the color of the source of illumination. With the invention, an illuminated fishing lure apparatus is provided which does not include an activation switch which depends on the conductivity of water. With the invention, an illuminated fishing lure apparatus is provided which employs an off-the-shelf electronic module for controlling the flash rates of the lure illuminators. With the invention, an illuminated fishing lure apparatus is provided with an off-the-shelf flasher module for driving LEDs. With the invention, an illuminated fishing lure apparatus is provided which includes an LM3909 flasher module for driving LEDs. With the invention, an illuminated fishing lure apparatus is provided with either a variable resistance or a variable capacitor in an RC circuit so that the flash rate of the flasher can be changed as desired.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved illuminated fishing lure apparatus, comprising:
    a housing assembly which simulates a body of an organism, said housing assembly also including two transparent portions that simulate two eyes of the organism,
    a hook assembly attached to said housing assembly,
    a pair of selectively colored LED illuminators positioned adjacent to said transparent eye-simulating portions of said housing assembly and adapted to be plugged into and unplugged from a circuit board, said illuminators serving as sources of illumination for said transparent eye-simulating portions of said housing assembly, and
    electronic flashing circuitry, contained within said housing assembly and connected to said simulated-eye illuminators, for driving said illuminators at a predetermined flashing rate, wherein said electronic flashing circuitry includes: a battery supply, an electronic flasher module connected to said battery supply, and a flash-rate-change assembly, connected to said electronic flasher module, for changing the predetermined flash rate at which said illuminators flash.

2. The apparatus described in claim 1 wherein flash-rate-change assembly is a variable capacitor.

3. The apparatus of claim 1 wherein said selectively colored LED illuminators emit a red light.

4. The apparatus of claim 1 wherein said selectively colored LED illuminators emit a green light.

5. The apparatus of claim 1 wherein said selectively colored LED illuminators emit a yellow light.

* * * * *